US006850826B1

(12) United States Patent
Nishiyama et al.

(10) Patent No.: US 6,850,826 B1
(45) Date of Patent: Feb. 1, 2005

(54) VEHICLE NETWORK SYSTEM AND A METHOD OF CONTROLLING STATES OF VEHICLE APPARATUSES

(75) Inventors: Hiroshi Nishiyama, Shizuoka (JP);
Yoshikazu Saito, Shizuoka (JP);
Akiyoshi Tomita, Shizuoka (JP);
Katsutoshi Nakajima, Shizuoka (JP);
Akira Norizuki, Shizuoka (JP);
Kazuyoshi Unno, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 637 days.

(21) Appl. No.: 09/342,234

(22) Filed: Jun. 29, 1999

(30) Foreign Application Priority Data

Jun. 30, 1998 (JP) .......................................... 10-184752

(51) Int. Cl.[7] .......................... B60R 22/00; E05F 15/00; G01M 17/00; G06F 7/00
(52) U.S. Cl. .............................. 701/48; 701/29; 701/31; 701/33; 701/36
(58) Field of Search .............................. 701/48, 33, 29, 701/31, 36

(56) References Cited

U.S. PATENT DOCUMENTS 6,038,500 A * 3/2000 Weiss .......................... 701/22
6,052,632 A * 4/2000 Iihoshi et al. .................. 701/36

\* cited by examiner

*Primary Examiner*—Thomas G. Black
*Assistant Examiner*—Brian J. Broadhead
(74) *Attorney, Agent, or Firm*—Sughrue Mion, PLLC

(57) ABSTRACT

A communication IC (11a) in an AV controller (1) periodically notifies plural slave apparatuses (e.g., a CD player (3), a radio (5), and an amplifier (7)) of a system state command containing a system state in which states of all the plural slave apparatuses are managed in a lump. CPUs (13a to 13d) of the slave apparatuses determine whether or not the current apparatus state of the corresponding slave apparatus coincides with the system state in the system state command from the AV controller. If the current own apparatus state does not coincide with the system state in the system state command, the current own apparatus state is made coincident with the system state command.

10 Claims, 7 Drawing Sheets

Fig. 5

| (command length) | Source address | destination address | OPC | OPR "1" | apparatus address of radio | apparatus address of amplifier | MUTE OFF |

Fig. 6

| (command length) | Source address | destination address | OPC | OPR "1" | apparatus address of CD player | apparatus address of amplifier | MUTE OFF |

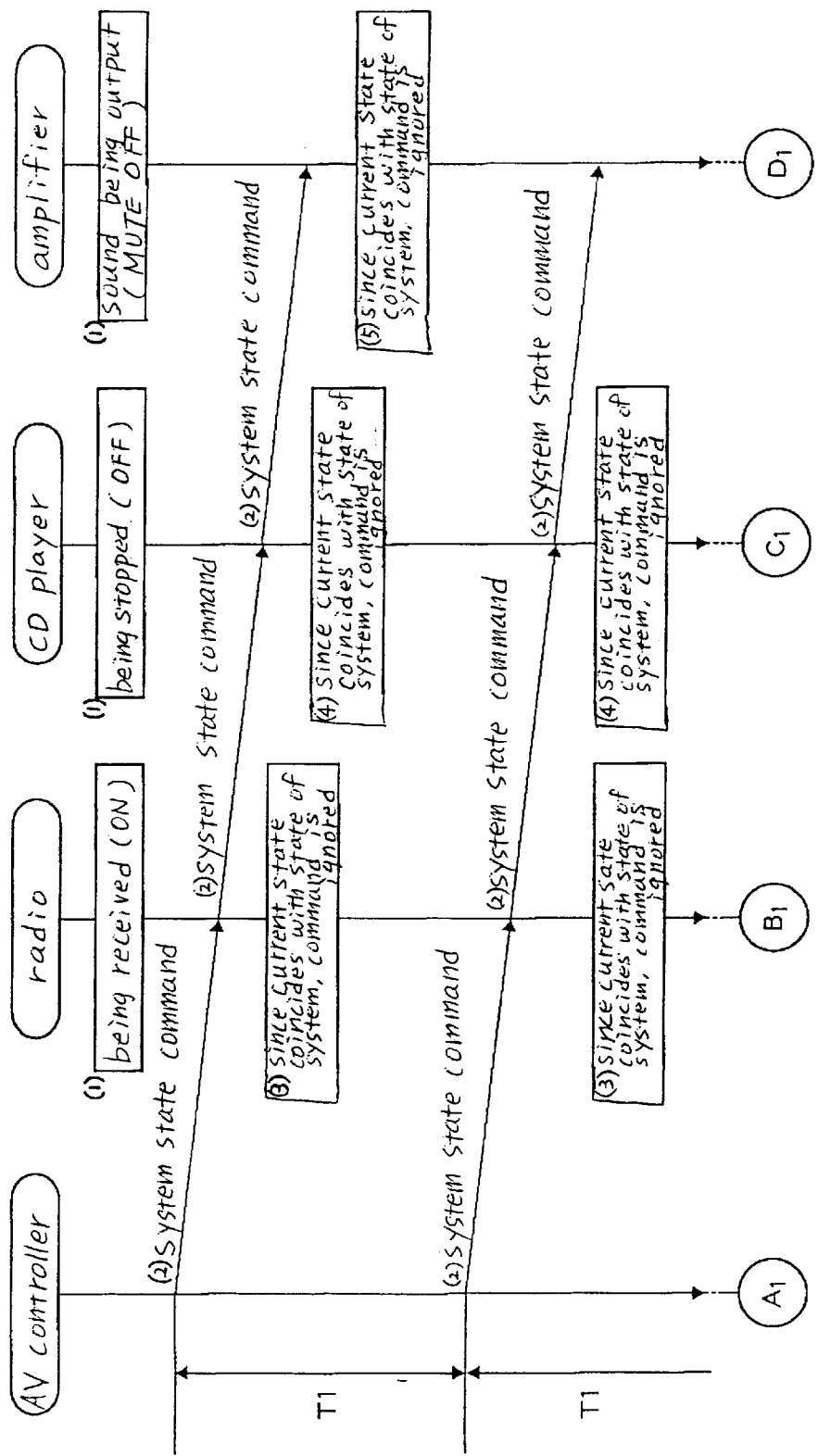

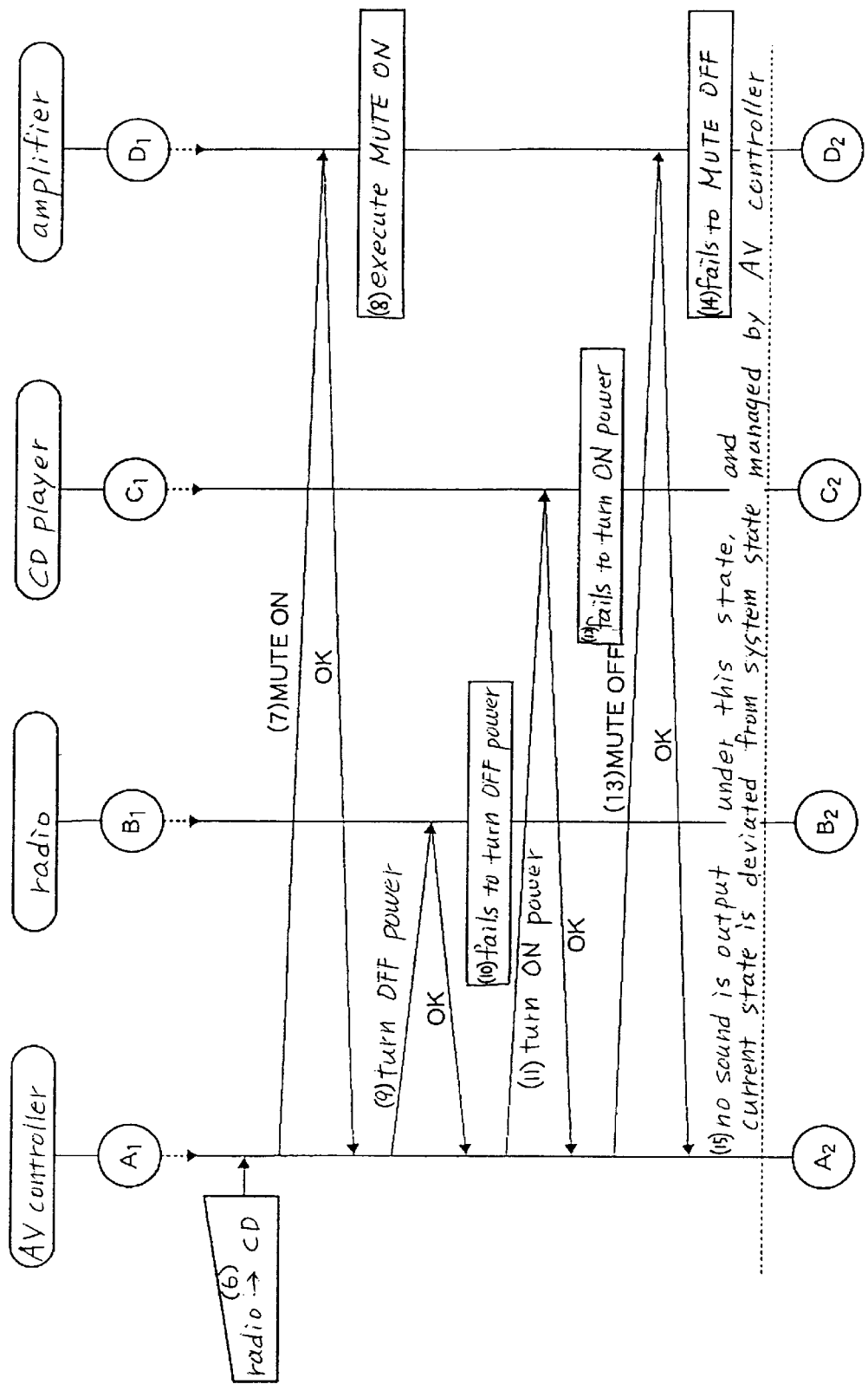

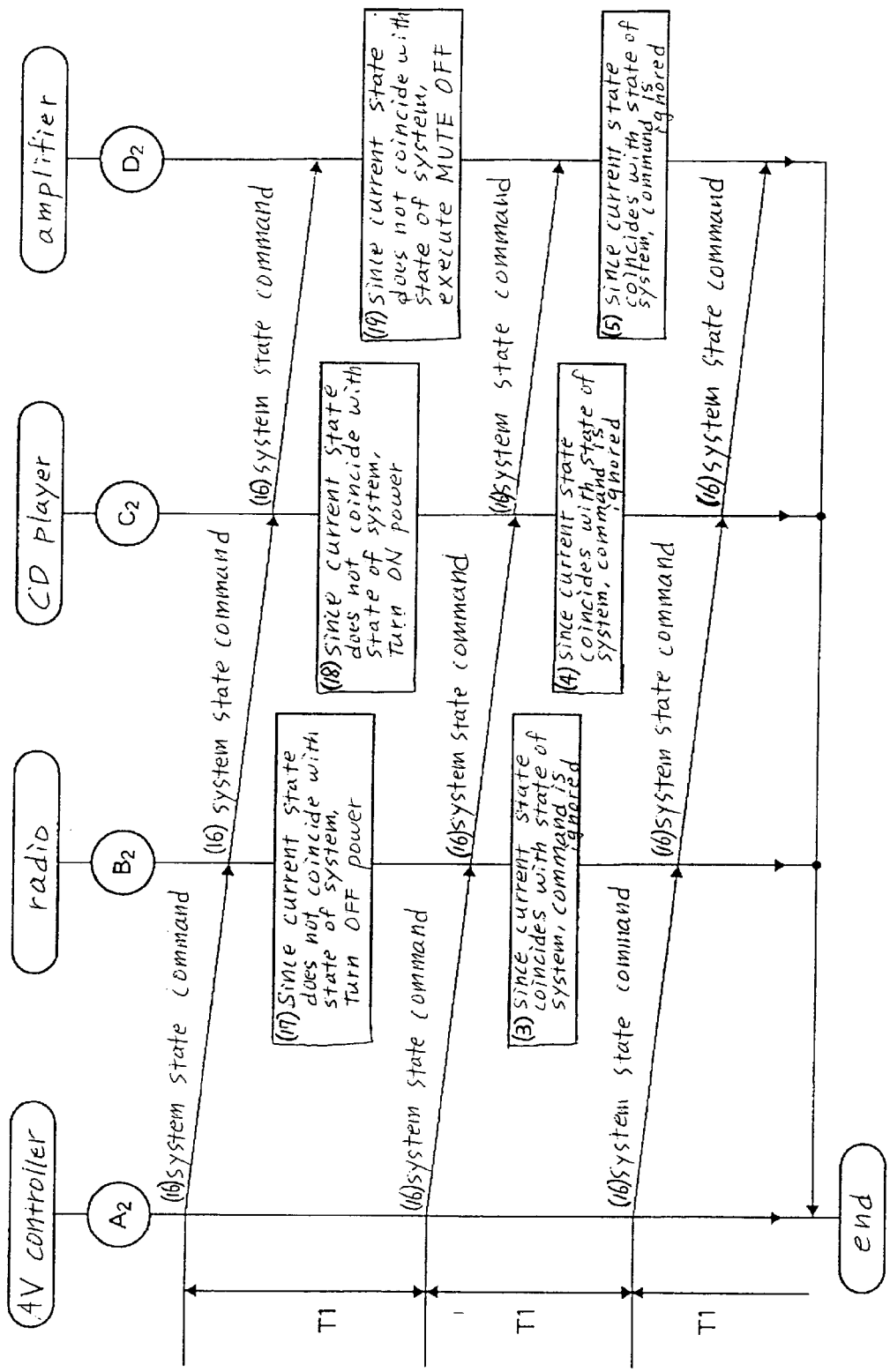

VEHICLE NETWORK SYSTEM AND A METHOD OF CONTROLLING STATES OF VEHICLE APPARATUSES

BACKGROUND OF THE INVENTION

1. Field of the Invention

The present invention relates to a vehicle network system and a method of controlling states of vehicle apparatuses in which plural slave apparatuses and a master are connected to a transmission path, and the master sends commands through the transmission path to control states of the slave apparatuses.

The present application is based on Japanese Patent Application No. Hei. 10-184752, which is incorporated herein by reference.

2. Description of the Related Art

A vehicle network system of the type is mounted on a vehicle, and includes slave apparatuses including electric apparatuses such as a radio, an amplifier, a compact disc player (hereinafter, referred to as "CD player"), and a compact cassette player; and a master apparatus including an audio/video controller (hereinafter, referred to as "A/V controller") and the like. The slave apparatuses and the master are connected to a transmission path such as a common bus.

In the above vehicle network system, the master transmits an operation request command to the slave apparatuses through the transmission path, thereby controlling the states of the slave apparatuses. Therefore, the slave apparatuses start to operate in response to the operation request command.

When the state of one of the slave apparatuses is changed, for example, when the CD player is transferred from the stop state to the play state, the slave apparatus transmits the state change as a state report, to the master. The master monitors the state report sent from the slave apparatus.

In such a network system, when an abnormality such as a transmission error, an abnormal operation of one of the slave apparatuses, or a runaway of a slave apparatus which is not controlled by the master is developed, the network system enters an abnormal condition.

In order to prevent an abnormal condition of the network system from occurring, or restore the network system from an abnormal condition, the master is required to always monitor the network system for an abnormal condition.

When an abnormality is developed in one of the slave apparatuses, for example, the state report sent from the slave apparatus fails to coincide with the system state which is managed by the master. Therefore, the master resends the operation request command to the slave apparatuses, or requests the abnormal slave apparatus to stop the operation. Consequently, a large burden is imposed on the master.

SUMMARY OF THE INVENTION

It is an object of the present invention to provide a vehicle network system and a method of controlling states of vehicle apparatuses in which the burden on a master to monitor slave apparatuses for an abnormal state and to restore a slave apparatus from an abnormal state can be reduced.

In order to achieve the above object, the plural aspects of the present invention are respectively defined as follows.

According to the first aspect of the present invention, there is provided a vehicle network system which comprises a plurality of slave apparatuses connected to a transmission path, one master connected to the transmission path, the master controlling states of the respective slave apparatuses through the transmission path, the master including command notifying means for periodically notifying the respective slave apparatuses of a system state command containing a system state in which states of all of the slave apparatuses are managed in a lump, wherein each of the slave apparatuses includes determining means for determining whether a current apparatus state of the slave apparatus coincides with the system state in the system state command which is received from the master, and apparatus state changing means for, when the determining means determines that the current apparatus state of the slave apparatus does not coincide with the system state, making the current apparatus state of the slave apparatus coincident with the system state.

That is, the master is requested only to periodically notify the slave apparatuses of the system state command. Each of the slave apparatuses conducts by itself processing for restoring from an abnormal state. Therefore, the burden on the master can be reduced.

According to the second aspect of the present invention, when the determining means determines that the current apparatus state of the slave apparatus coincides with the system state, preferably, the apparatus state changing means maintains the current apparatus state of the slave apparatus. Accordingly, if the current slave apparatus state coincides with the system state, the current slave apparatus state is maintained, and therefore, the state coincident with the system state command can be maintained.

According to the third aspect of the present invention, preferably, the system state command contains a source address, a destination address, operation state existence information indicative of whether the plurality of slave apparatuses include a slave apparatus in an operation state, and an apparatus address of the slave apparatus in the operation state. Accordingly, since the system state command contains operation state existence information and an apparatus address of a slave apparatus in an operation state, the states of the slave apparatuses can be made coincident with the system state command. Therefore, the reliability of the system can be enhanced.

According to the fourth aspect of the present invention, preferably, the determining means of each of the slave apparatuses refers the apparatus address of the slave apparatus in the operation state, as the system state, and determines whether the current apparatus state of the slave apparatus coincides with the system state. Accordingly, each of the slave apparatuses can refer the apparatus addresses of the slave apparatuses in an operation state, as the system state, and determine whether the current own apparatus state coincides with the system state or not.

According to the fifth aspect of the present invention, there is provided a method of controlling states of vehicle apparatuses. First, a plurality of slave apparatuses and one master, connected to a transmission path, are provided. The master controls states of the slave apparatuses through the transmission path. Next, the master is caused to periodically notify the slave apparatuses of a system state command containing a system state in which states of all of the plural slave apparatuses are managed in a lump. Then, each of the slave apparatuses is caused to determine whether a current apparatus state of the slave apparatus coincides with the system state in the system state command which is received from the master, and then, the current state of the slave apparatus coincident with the system state is caused when it is determined that the current apparatus state of the slave apparatus does not coincide with the system state.

According to the sixth aspect of the present invention, preferably, the method of the fifth aspect of the present invention further comprises a step of maintaining the current apparatus state of the slave apparatus when it is determined that the current apparatus state of the slave apparatus coincides with the system state.

According to the seventh aspect of the present invention, preferably, the system state command contains a source address, a destination address, operation state existence information indicative of whether the plural slave apparatuses include a slave apparatus in an operation state, and an apparatus address of the slave apparatus in an operation state.

According to the eighth aspect of the present invention, preferably, the method of the seventh aspect of the present invention further comprises a step of causing each of the slave apparatuses to refer the apparatus address of the slave apparatus in the operation state as the system state, and determine whether the current apparatus state of the slave apparatus coincides with the system state.

BRIEF DESCRIPTION OF THE DRAWINGS

FIG. 5 is a diagram showing a system state command in which a radio and an amplifier are set to an ON state;

FIG. 6 is a diagram showing a system state command in which a CD player and the amplifier are set to an ON state;

FIG. 7 is a diagram showing a communication sequence in the case where the states of the slave apparatuses coincide with the system state;

FIG. 8 is a diagram showing a communication sequence in the case where the control of the AV controller is switched from the radio to the CD player; and FIG. 9 is a diagram showing a communication sequence in the case where the states of the slave apparatuses do not coincide with the system state.

DETAILED DESCRIPTION OF THE PREFERRED EMBODIMENT

Figure 1:
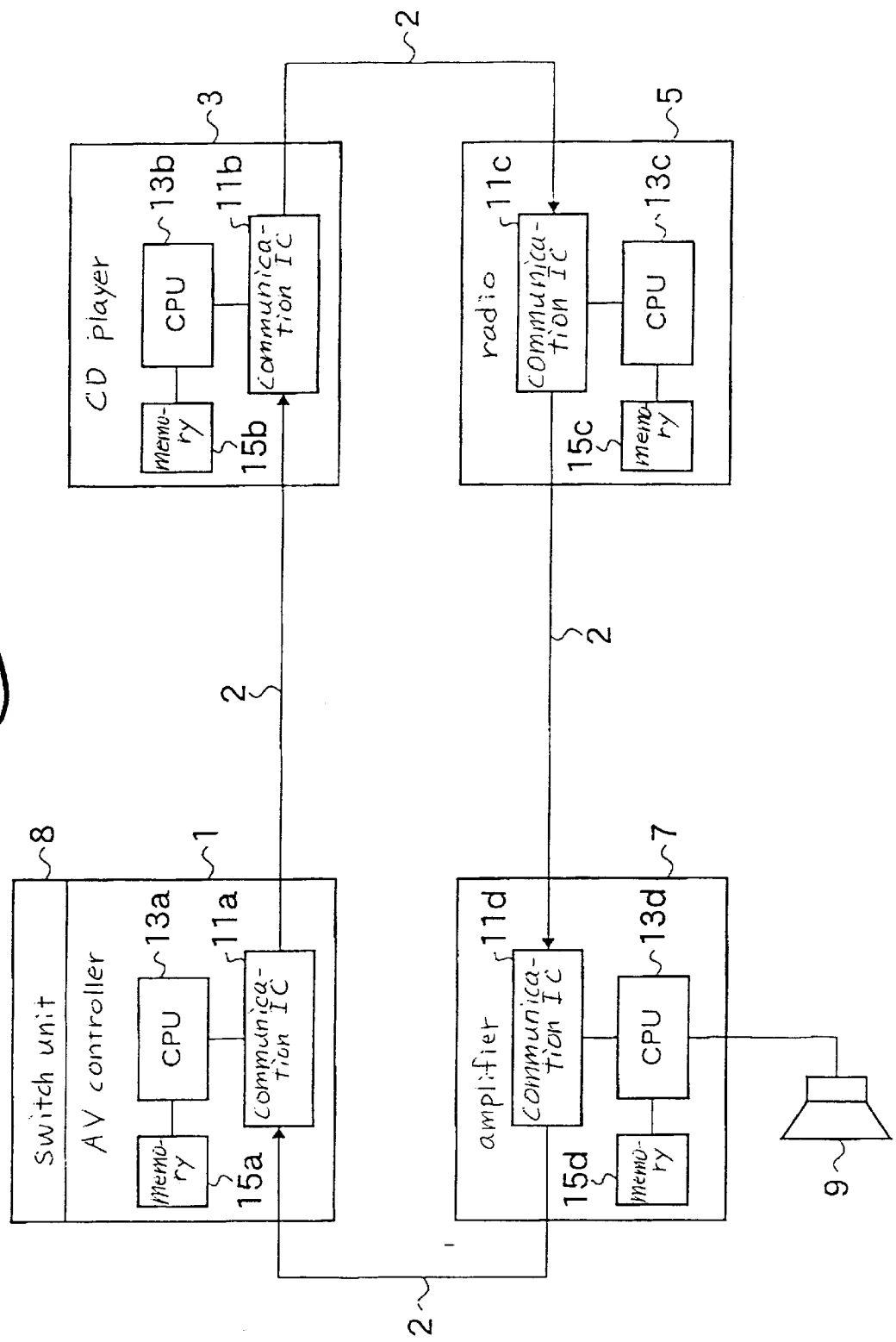
FIG. 1 is a block diagram showing the configuration of a vehicle network system of an embodiment of the present invention.

Hereinafter, an embodiment of a vehicle network system and a method of controlling states of vehicle apparatuses according to the present invention will be described in detail with reference to the accompanying drawings. FIG. 1 is a block diagram showing the configuration of a vehicle network system of an embodiment of the present invention.

In the vehicle network system, an AV controller 1, a CD player 3, a radio 5, and an amplifier 7 are connected to one another in a ring-like manner through a transmission path 2 so that data and commands are transmitted in the direction of the arrows.

The AV controller 1 is a master which controls operations of the apparatuses, i.e., the CD player 3, the radio 5, and the amplifier 7. The CD player 3, the radio 5, and the amplifier 7 function as slave apparatuses. A loudspeaker 9 for outputting a sound is connected to the amplifier 7. A switch unit 8 having a selector switch for switching over the CD player 3, the radio 5, and the amplifier 7 is connected to the AV controller 1.

The AV controller 1 comprises a communication integrated circuit (communication IC) 11a, a central processing unit (CPU) 13a, and a memory 15a. The CD player 3 comprises a communication IC 11b, a CPU 13b, and a memory 15b. The radio comprises a communication IC 11c, a CPU 13c, and a memory 15c. The amplifier 7 comprises a communication IC 11d, a CPU 13d, and a memory 15d.

In the AV controller 1, the memory 15a stores the address of the controller, a source address, a destination address, data, etc. The CPU 13a analyzes and processes data stored in the memory 15a, and produces a system state command containing a system state in which states of all the plural slave apparatuses (the CD player 3, the radio 5, and the amplifier 7) are managed in a lump.

The communication IC 11a includes command notifying means for periodically notifying the system state command which is produced by the CPU 13a, to the radio 5, the CD player 3, and the amplifier 7. The system state command will be described in detail later.

In each of the apparatuses, or the CD player 3, the radio 5, and the amplifier 7, when received data (including commands) are those directed to the apparatus, the communication IC 11b, 11c, or 11d takes in the data and the memory stores the data. When received data are those directed to another apparatus, the data are sent as they are to the transmission path 2, and, when there are data to be transmitted, the data to be transmitted are set to the transmission path 2.

The memories 15b to 15d store the addresses of the respective apparatuses, data, etc. The CPUs 13b to 13d analyze and process data stored in the respective memories. Each of the CPUs 13b to 13d includes determining means for determining whether or not the current own apparatus state coincides with the system state in the system state command which is received from the AV controller 1.

Each of the CPUs 13b to 13d also includes apparatus state changing means for, if the corresponding determining means determines that the current slave apparatus state does not coincide with the system state, making the current own apparatus state coincident with the system state in the system state command.

Figure 2:
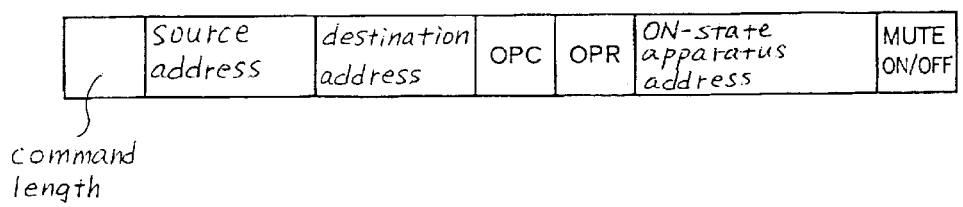
FIG. 2 is a diagram showing a system state command which is transmitted from an AV controller serving as a master, to slave apparatuses.

FIG. 2 shows the system state command which is transmitted from the AV controller serving as a master, to the slave apparatuses. The system state command shown in FIG. 2 has a command length, a source address, a destination address, an operation code (OPC), an operand (OPR), an ON-state apparatus address, and MUTE ON/OFF.

The command length indicates the length of the system state command. The source address indicates the address of an apparatus from which the system state command is sent. In this case, the source address is the address of the AV controller 1. The destination address indicates the address of an apparatus to which the system state command is to be sent, and usually is an address which can be broadcast-processed. The OPC indicates that the command is a system state command.

The OPR is flag information indicative of whether at least one of the slave apparatuses is in an ON state or all of the slave apparatuses are in an OFF state. When there is a slave apparatus in an ON state, the flag information is set to, for example, "1," and, when all of the slave apparatuses are in an OFF state, the flag information is set to, for example, "0." The ON-state apparatus address indicates the address of a slave apparatus which is to be set to an ON state. "MUTE ON/OFF" is information indicative of either of MUTE ON (sound is stopped) and MUTE OFF (sound is output).

Figure 3:
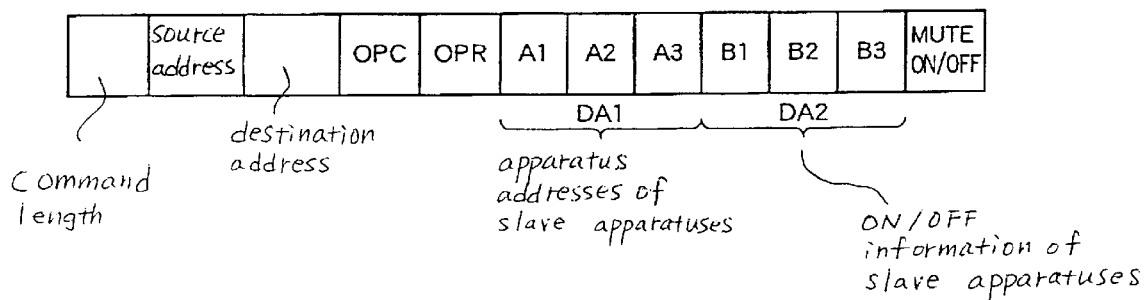
FIG. 3 is a diagram showing another format of the system state command.

FIG. 3 shows another format of the system state command. The system state command shown in FIG. 3 has a command length, a source address, a destination address, an OPC, an OPR, apparatus addresses A1 to A3 of the slave apparatuses which are stored in a data area DA1, ON/OFF information B1 to B3 of the slave apparatuses which are stored in a data area DA2, and MUTE ON/OFF.

The apparatus address A1 indicates the apparatus address of the CD player 3, the apparatus address A2 indicates that of the radio 5, and the apparatus address A3 indicates that of the amplifier 7.

The ON/OFF information B1 is information indicative of the ON or OFF state of the CD player 3, the ON/OFF information B2 is information indicative of the ON or OFF state of the radio 5, and the ON/OFF information B3 is information indicative of the ON or OFF state of the amplifier 7.

In the system state command shown in FIG. 3, information indicative of the ON or OFF state of each slave apparatus is added to the command. When each slave apparatus searches the ON/OFF information corresponding to the own apparatus address, therefor, the slave apparatus can determine the operation state.

Figure 4:
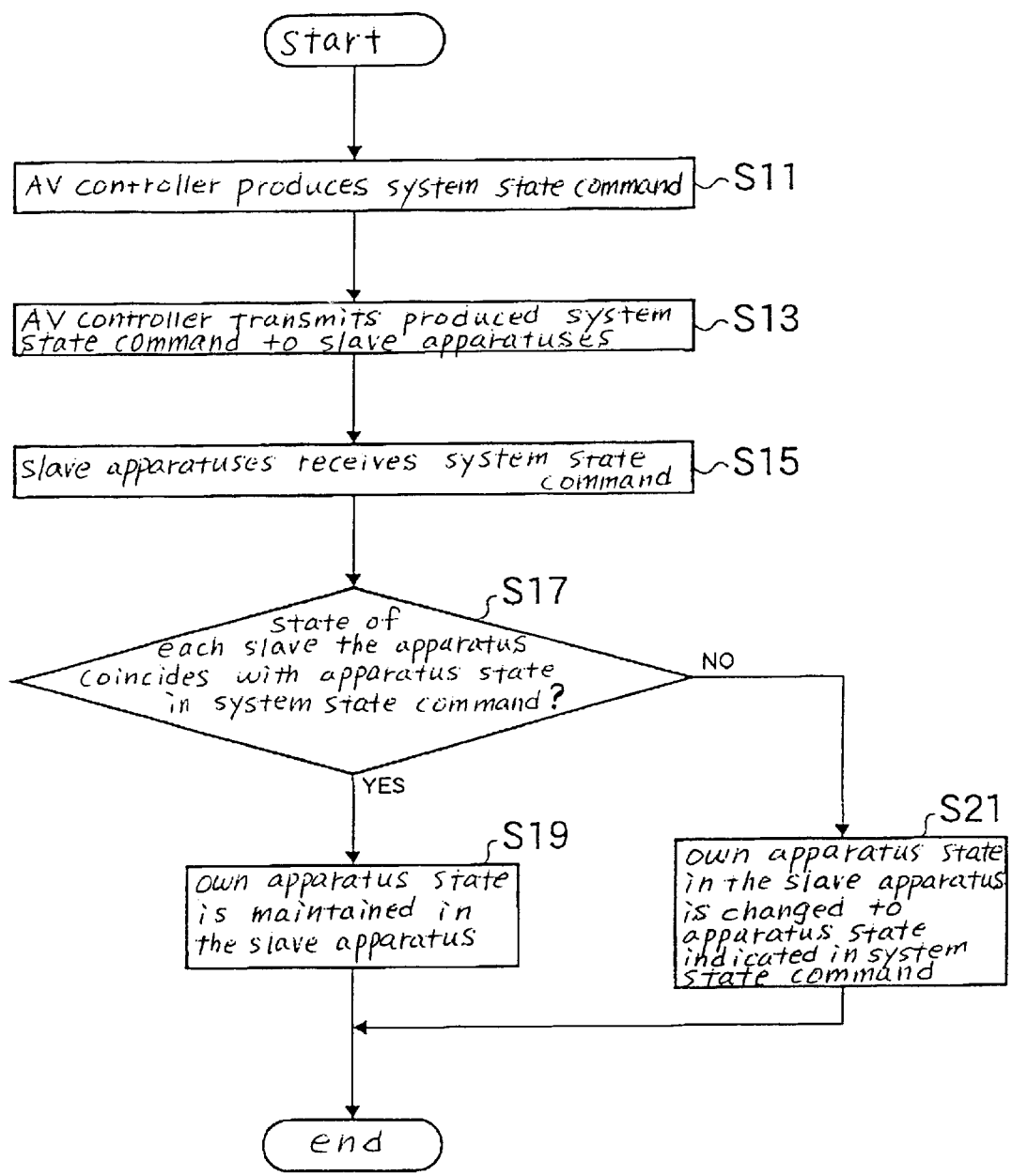
FIG. 4 is a flowchart of a basic fail-safe operation of the vehicle network system.

FIG. 4 is a flowchart of a basic fail-safe operation of the vehicle network system. Referring to FIG. 4, the basic fail-safe operation of the vehicle network system, i.e., the method of controlling states of vehicle apparatuses will be described. The term "failsafe" means a process of, when an abnormality is developed in the network system, restoring the system from the abnormal state.

In the AV controller 1, the CPU 13a produces the system state command for the slave apparatuses of the network system (step S11). The communication IC 11a of the AV controller 1 periodically transmits the produced system state command to the slave apparatuses (step S13).

When the communication IC of each of the slave apparatuses receives the system state command from the AV controller 1 (step S15), the CPU of the slave apparatus determines whether or not the current state of the apparatus coincides with the system state (apparatus state) in the system state command and corresponding to the apparatus (step S17).

If the slave apparatus state coincides with the system state in the system state command and corresponding to the apparatus, the current slave apparatus state is maintained in the apparatus (step S19).

By contrast, if the own apparatus state does not coincide with the system state in the system state command and corresponding to the apparatus, the CPU of the slave apparatus makes the current own apparatus state coincident with the system state in the system state command and corresponding to the apparatus (step S21).

For example, the case where the own apparatus state does not coincide with the system state in the system state command and corresponding to the apparatus arises in the following situation. An abnormal condition such as maloperation of the slave apparatus occurs. Even when the slave apparatus receives the operation request command from the AV controller 1, therefore, the slave apparatus fails to change the operation state in accordance with the operation request command.

In this way, if the own apparatus state does not coincide with the system state, the state of the slave apparatus is made coincident with the system state of the AV controller 1. That is, the slave apparatus itself conducts processing for restoring from an abnormal state. Therefore, the burden on the master can be reduced.

Next, a specific fail-safe operation of the vehicle network system, i.e., the method of controlling states of vehicle apparatuses will be described with reference to communication sequences shown in FIGS. 7 to 9. FIG. 5 shows a system state command in which the radio and the amplifier are set to the ON state, and FIG. 6 shows a system state command in which the CD player and the amplifier are set to the ON state.

FIG. 7 shows a communication sequence in the case where the states of the slave apparatuses coincide with the system state, FIG. 8 shows a communication sequence in the case where the control of the AV controller is switched from the radio to the CD player, and FIG. 9 shows a communication sequence in the case where the states of the slave apparatuses do not coincide with the system state. The communication sequences shown in FIGS. 7 to 9 are sequentially executed.

First, the operation shown in FIG. 7 will be described. In (1), the radio 5 and the amplifier 7 are in the ON state so that the radio 5 performs the reception and the amplifier 7 outputs the sound of the radio 5 to the loudspeaker 9 (in MUTE OFF). The power source of the CD player 3 is in the OFF state so that the operation of the player is stopped.

Next, in (2), the AV controller 1 produces the system state command in which the radio and the amplifier are set to the ON state as shown in FIG. 5. The AV controller 1 transmits the produced system state command to all of the slave apparatuses, i.e., the radio 5, the CD player 3, and the amplifier 7, in a periodical manner (for example, at intervals of constant time period $T_1$).

In (3), in the radio 5, the communication IC 11c receives the system state command, and the CPU 13c determines whether the current own state coincides with the state indicated by the system state command or not. Both the current own state and the state indicated by the system state command are the ON state, or coincide with each other. Therefore, the system state command is ignored and the current state is maintained.

In (4), in the CD player 3 also, the system state command is received, and the CPU 13b determines whether the current own state coincides with the state indicated by the system state command or not. Both the current own state and the state indicated by the system state command are the OFF state, or coincide with each other. Therefore, the system state command is ignored and the current state is maintained.

In (5), in the amplifier 7 also, the system state command is received, and the CPU 13d determines whether the current own state coincides with the state indicated by the system state command or not. Both the current own state and the state indicated by the system state command are the ON state (MUTE OFF), or coincide with each other. Therefore, the system state command is ignored and the current state is maintained.

After elapse of the constant time period $T_1$, the AV controller 1 transmits the system state command to the slave apparatuses, and the slave apparatuses conduct the above-mentioned determination processings, respectively.

Next, the operation shown in FIG. 8 will be described. First, in (6), the switch unit 8 of the AV controller 1 is pressed in order to switch over the control from the radio 5 to the CD player 3.

Next, in (7), the AV controller 1 transmits a MUTE ON command to the amplifier 7. The amplifier 7 returns a reply (OK) to the reception of the MUTE ON command, to the AV controller 1. In (8), the amplifier 7 which has received the MUTE ON command executes the MUTE ON command to stop the output of the sound.

In (9), the AV controller 1 transmits a power OFF command to the radio 5. The radio 5 returns a reply (OK) to the reception of the power OFF command, to the AV controller 1. It is assumed that, in (10), the radio 5 cannot correctly execute an operation corresponding to the received power OFF command and fails to turn OFF the power.

In (11), the AV controller 1 transmits a power ON command to the CD player 3. The CD player 3 returns a reply (OK) to the reception of the power ON command, to the AV controller 1. It is assumed that, in (12), the CD player 3 cannot correctly execute an operation corresponding to the received power ON command and fails to turn ON the power.

In (13), the AV controller 1 transmits a MUTE OFF command to the amplifier 7. The amplifier 7 returns a reply (OK) to the reception of the MUTE OFF command, to the AV controller 1. It is assumed that, in (14), the amplifier 7 cannot correctly execute an operation corresponding to the received MUTE OFF command and fails to conduct MUTE OFF.

In (15), therefore, no sound is output under this state, and the current state is deviated from the system state which is managed by the AV controller 1.

Next, the operation shown in FIG. 9 will be described. First, in (16), the AV controller 1 produces a system state command in which the CD player 3 and the amplifier 7 are set to the ON state as shown in FIG. 6. The AV controller 1 transmits the produced system state command to all of the slave apparatuses, i.e., the radio 5, the CD player 3, and the amplifier 7, in a periodical manner (for example, at intervals of constant time period $T_1$).

In (17), in the radio 5, the communication IC 11c receives the system state command, and the CPU 13c determines whether the current own state coincides with the state indicated by the system state command or not. The current own state (the power ON state) does not coincide with the state (the power OFF state) indicated by the system state command. Therefore, the current state is changed to the power OFF state which is indicated by the system state command.

In (18), in the CD player 3 also, the system state command is received, and the CPU 13b determines whether the current own state coincides with the state indicated by the system state command or not. The current own state (the power OFF state) does not coincide with the state (the power ON state) indicated by the system state command. Therefore, the current state is changed to the power ON state which is indicated by the system state command.

In (19), in the amplifier 7 also, the system state command is received, and the CPU 13d determines whether the current own state coincides with the state indicated by the system state command or not. The current own state (MUTE ON) does not coincide with the state (MUTE OFF) indicated by the system state command. Therefore, the current state is changed to MUTE OFF which is indicated by the system state command.

As a result, the states of the slave apparatuses coincide with the system state of the AV controller 1.

After elapse of the constant time period $T_1$, the AV controller 1 transmits the system state command to the slave apparatuses, and the slave apparatuses conduct the above-mentioned determination processings, respectively. In this case, the states of the slave apparatuses coincide with the system state of the AV controller 1, and hence the system state command is ignored as in (3), (4), and (5).

In this way, the AV controller 1 serving as a master periodically transmits the system state command to the radio 5, the CD player 3, and the amplifier 7 serving as slave apparatuses. In each of the slave apparatuses which receive the system state command, if the state of the apparatus does not coincide with the state of the system state command, the state of the apparatus is made coincident with the state of the system state command.

In other words, the master is requested only to periodically transmit the system state command to the slave apparatuses. When an abnormality occurs in one of the slave apparatuses, the slave apparatus conducts by itself processing for restoring from the abnormal state. Therefore, the master is not required to monitor the slave apparatuses and conduct processing for restoring from an abnormal state, with result that the burden on the master can be reduced.

As far as a slave apparatus is not faulty, the slave apparatus can maintain the operation state coincident with the system state command. Consequently, the reliability of the network system can be enhanced.

Even when the master cannot detect an abnormality such as maloperation of one of the slave apparatuses, the slave apparatus itself can detect its own operation state, and therefore can be recovered from the abnormal state.

The present invention is not restricted to the vehicle network system of the embodiment. In the embodiment, the system state command is periodically transmitted to the slave apparatuses, in the data format shown in FIG. 2. The data format of the system state command is not limited to this. For example, the system state command may be periodically transmitted to the slave apparatuses, in the data format shown in FIG. 3.

The networks system is not restricted to a ring-like network system, and may be a local area network (LAN). The apparatuses are not limited to the electric apparatuses used in the embodiment. For example, the apparatuses may include other apparatuses such as a compact cassette player, a navigation system, and a display device.

According to the present invention, the master periodically notifies the slave apparatuses of a system state command. In each of the slave apparatuses, if it is determined that the current own apparatus state does not coincide with the system state in the system state command, the current own apparatus state is made coincident with the system state.

That is, the master is requested only to periodically notify the slave apparatuses of the system state command. Each of the slave apparatuses conducts by itself processing for restoring from an abnormal state. Therefore, the burden on the master can be reduced.

According to the present invention, if the current own apparatus state coincides with the system state, the current own apparatus state is maintained, and hence the state coincident with the system state command can be maintained.

According to the present invention, since the system state command contains operation state existence information and an apparatus address of a slave apparatus in an operation state, the apparatus states of the slave apparatuses can be made coincident with the system state command. Therefore, the reliability of the system can be enhanced.

According to the present invention, each of the slave apparatuses can refer the apparatus addresses of the slave apparatuses in an operation state, as the system state, and determine whether the current own apparatus state coincides with the system state or not.

What is claimed is:

1. A vehicle network system, comprising:

a transmission path;

a plurality of slave apparatuses connected to the transmission path;

one master apparatus connected to the transmission path, the master apparatus controlling states of the respective slave apparatuses through the transmission path, the master apparatus including a command notifying device that periodically notifies the respective slave apparatuses of a system state command containing a system state in which states of all of the slave apparatuses are collectively managed, wherein each of the slave apparatuses includes:

a memory which stores a current apparatus state of the respective slave apparatuses;

a determining device for determining whether the current apparatus state stored in said memory of the slave apparatus coincides with the system state in the system state command that is received from the master apparatus; and an apparatus state changing device for making the current apparatus state stored in said memory of the slave apparatus coincident with the system state when the determining device determines that the current apparatus state of the slave apparatus does not coincide with the system state.

2. The vehicle network system of claim 1, wherein, when the determining device determines that the current apparatus state of the slave apparatus coincides with the system state, the apparatus state changing device maintains the current apparatus state of the slave apparatus.

3. The vehicle network system of claim 1, wherein the system state command contains a source address, a destination address, operation state existence information indicative of whether the plurality of slave apparatuses include a slave apparatus in an operation state, and an apparatus address of the slave apparatus in the operation state.

4. The vehicle network system of claim 2, wherein the system state command contains a source address, a destination address, operation state existence information indicative of whether the plurality of slave apparatuses include a slave apparatus in an operation state, and an apparatus address of the slave apparatus in the operation state.

5. The vehicle network system of claim 3, wherein the determining device of each of the slave apparatuses refers the apparatus address of the slave apparatus in the operation state, as the system state, and determines whether the current apparatus state of the slave apparatus coincides with the system state.

6. The vehicle network system of claim 4, wherein the determining device of each of the slave apparatuses refers the apparatus address of the slave apparatus in the operation state as the system state, and determines whether the current apparatus state of the slave apparatus coincides with the system state.

7. A method of controlling states of vehicle apparatuses, comprising the steps of:

providing a plurality of slave apparatuses and one master apparatus which are connected to a transmission path, wherein the master apparatus controls states of the slave apparatuses through the transmission path;

storing a current apparatus state in a memory of each of said plurality of slave apparatuses as a current apparatus state;

causing the master apparatus to periodically notify the slave apparatuses of a system state command containing a system state in which states of all of the plural slave apparatuses are collectively managed;

causing each of the slave apparatuses to determine whether the current apparatus state of the slave apparatus coincides with the system state in the system state command which is received from the master apparatus; and making the current state of the slave apparatus coincident with the system state when it is determined that the current apparatus state of the slave apparatus does not coincide with the system state.

8. The method of claim 7, further comprising a step of maintaining the current apparatus state of the slave apparatus when it is determined that the current apparatus state of the slave apparatus coincides with the system state.

9. The method of claim 7, wherein the system state command contains a source address, a destination address, operation state existence information indicative of whether the plural slave apparatuses include a slave apparatus in an operation state, and an apparatus address of the slave apparatus in an operation state.

10. The method of claim 9, further comprising a step of causing each of the slave apparatuses to refer the apparatus address of the slave apparatus in the operation state as the system state, and determine whether the current apparatus state of the slave apparatus coincides with the system state.

* * * * *